(12) United States Patent
Fukada et al.

(10) Patent No.: US 7,478,859 B2
(45) Date of Patent: Jan. 20, 2009

(54) SEAT FOR VEHICLE

(75) Inventors: Ryuta Fukada, Kariya (JP); Hiroyuki Okazaki, Chiryu (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 289 days.

(21) Appl. No.: 11/385,716

(22) Filed: Mar. 22, 2006

(65) Prior Publication Data
US 2006/0214457 A1 Sep. 28, 2006

(30) Foreign Application Priority Data
Mar. 25, 2005 (JP) ............... 2005-088256

(51) Int. Cl.
*B60N 2/14* (2006.01)
(52) U.S. Cl. .................................. 296/65.01
(58) Field of Classification Search ............ 296/65.01, 296/66, 65.05, 65.08, 65.09, 65.16, 65.17, 296/65.18
See application file for complete search history.

(56) References Cited

U.S. PATENT DOCUMENTS 6,561,543 B1 * 5/2003 Hamada et al. ............ 280/735
6,773,068 B2 * 8/2004 Shinozaki ................ 297/344.1
7,066,539 B2 * 6/2006 Hatta et al. ............ 297/344.14
2003/0184112 A1 10/2003 Furui
2007/0052273 A1 * 3/2007 Satta et al. ............. 297/378.12

FOREIGN PATENT DOCUMENTS

| EP | 0 990 551 | 4/2000 |
| EP | 1 493 611 | 1/2005 |
| JP | 9-136566 | 5/1997 |
| JP | 2003-118451 A | 4/2003 |

* cited by examiner

*Primary Examiner*—H Gutman
(74) *Attorney, Agent, or Firm*—Finnegan, Henderson, Farabow, Garrett & Dunner, LLP

(57) ABSTRACT

A seat for a vehicle includes a base member provided on the seat and including a groove in which a striker is received and from which the striker is extracted, a hook member rotatably connected to the base member, a lever rotatably connected to the hook member, and a switch that can be in contact with the lever; wherein the lever activates the switch when the striker is received in the groove and whose movement is prohibited by the hook member.

9 Claims, 9 Drawing Sheets

SEAT FOR VEHICLE

CROSS REFERENCE TO RELATED APPLICATIONS

This application is based on and claims priority under 35 U.S.C. §119 to Japanese Patent Application No. 2005-088256, filed on Mar. 25, 2005, the entire content of which is incorporated herein by reference.

FIELD OF THE INVENTION

This invention generally relates to a seat for a vehicle. More particularly, the invention pertains to a seat for a vehicle including a lock device.

BACKGROUND

In order to ensure a vehicle interior space for luggage, passengers, and the like, a seat back folded down onto a seat cushion and the seat cushion are stowed into a space on a vehicle floor located on a front side or a rear side of the seat in a vehicle longitudinal direction. Such the vehicle seat is disclosed in JP2003-118451A. A known retractable vehicle seat may include right and left front legs in a vehicle width direction and rotatably connected to respective front portions on right and left sides of a seat cushion frame, and right and left rear legs in the vehicle width direction and rotatably connected to respective rear portions on right and left sides of the seat cushion frame. The vehicle seat may be normally in a seating position as the pair of front legs engage with respective strikers provided on the vehicle floor by means of each lock device including a latch and a pawl.

According to such the lock device, in order to detect a locked state of the latch, at least two detection switches are provided in the vicinity of the latch so that a large gray zone in the system can be addressed.

However, usage of two or more detection switches requires a complicated controller for the process conducted by the detection switches and may be uneconomical.

Thus, a need exists for a seat for a vehicle that can provide a simple structure and achieve cost reduction. The present invention has been made in view of the above circumstances and provides such a device.

SUMMARY OF THE INVENTION

According to an aspect of the present invention, a seat for a vehicle includes a base member provided on the seat and including a groove in which a striker is received and from which the striker is extracted, a hook member rotatably connected to the base member, a lever rotatably connected to the hook member, and a switch that can be in contact with the lever. The lever activates the switch when the striker is received in the groove and whose movement is prohibited by the hook member.

According to another aspect of the present invention, a seat for a vehicle in which a seat cushion and a seat back folded down onto the seat cushion are stowed into a storage space formed on a floor of the vehicle includes a front leg for supporting a front portion of the seat cushion, a rear leg provided on a rear portion of the seat cushion and including a lock member engaging with an engaging member provided on the floor of the vehicle, a groove formed on the front leg for receiving a striker, a hook member rotatably connected to the front leg and for opening or closing an opening portion of the groove, a lever rotatably connected to the hook member, and a switch supported on the front leg and activated by the lever.

According to further another aspect of the present invention, a seat for a vehicle includes a leg for supporting the seat and including a groove for receiving a striker, a hook member rotatably connected to the leg and for opening or closing an opening portion of the groove, a lever rotatably connected to the hook member, and a detecting unit activated by the lever.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
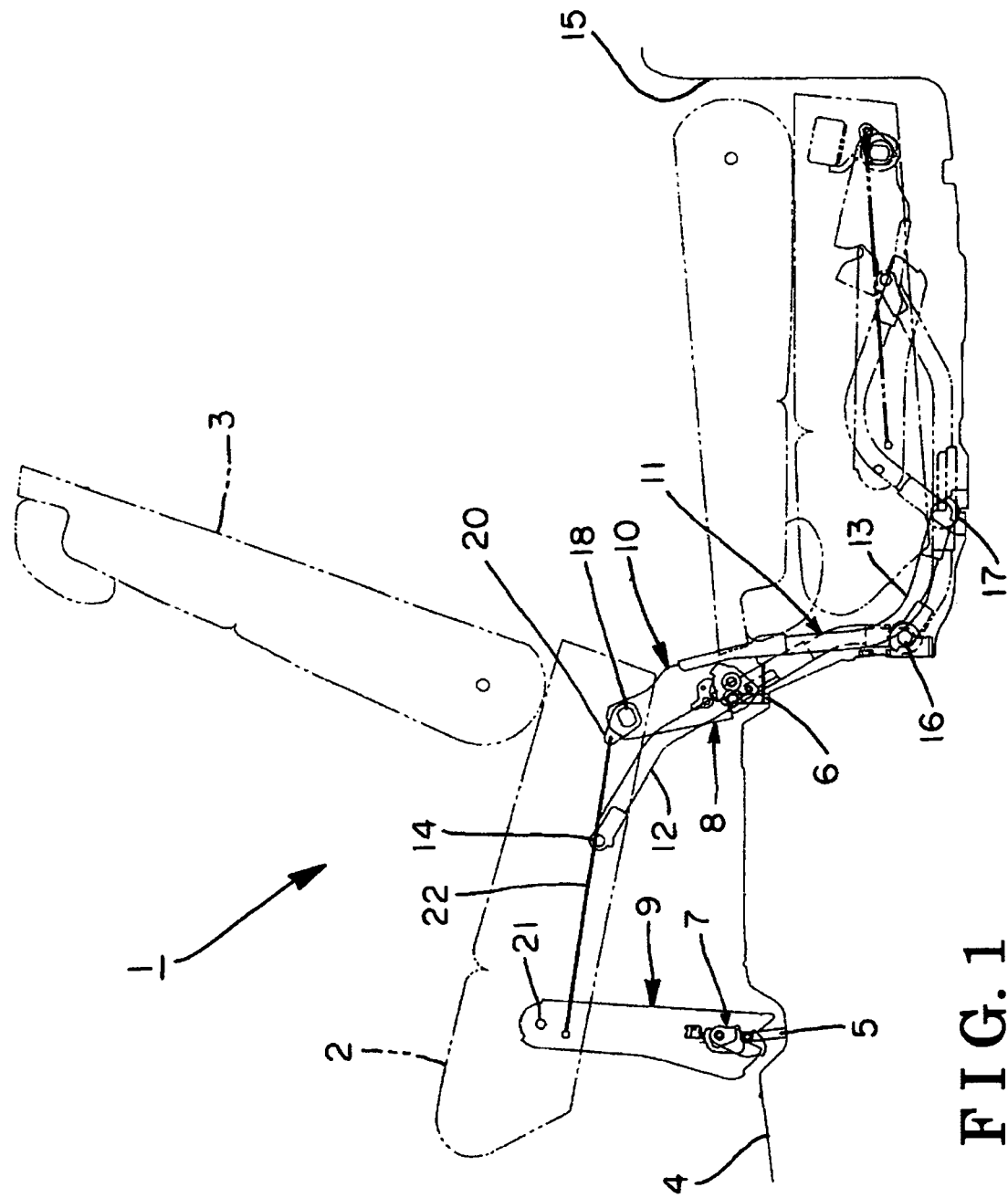
FIG. 1 is a front view of a vehicle seat according to an embodiment of the present invention.

An embodiment of the present invention is explained with reference to the attached drawings. As shown in FIG. 1, a vehicle seat 1 includes a seat cushion 2 and a seat back 3. The seat cushion 2 is supported on a floor 4 by means of right and left front legs 9 and right and left rears leg 10 in a vehicle width direction. The front leg 9 and the rear leg 10 respectively include lock devices 7 and 8 engageable with respective strikers 5 and 6 provided on the floor 4 of the vehicle. A supporter 11 of the seat cushion 2 has a four-link mechanism. Precisely, the supporter 11 is constituted by a pair of first links 12 arranged on both sides of the seat cushion 2 in the vehicle width direction, and a pair of second links 13 also arranged on both sides of the seat cushion 2 in the vehicle width direction, i.e. four parallel links. One end of each first link 12 is supported by a pivot axis 14 of a seat cushion frame 2' (see FIG. 3) of the seat cushion 2 while the other end of each first link 12 is supported by a pivot axis 16 provided within a seat storage space 15. In addition, one end of each second link 13 is secured to the rear leg 10 while the other end of each second link 13 is supported by a pivot axis 17 provided within the seat storage space 15.

Figure 3:
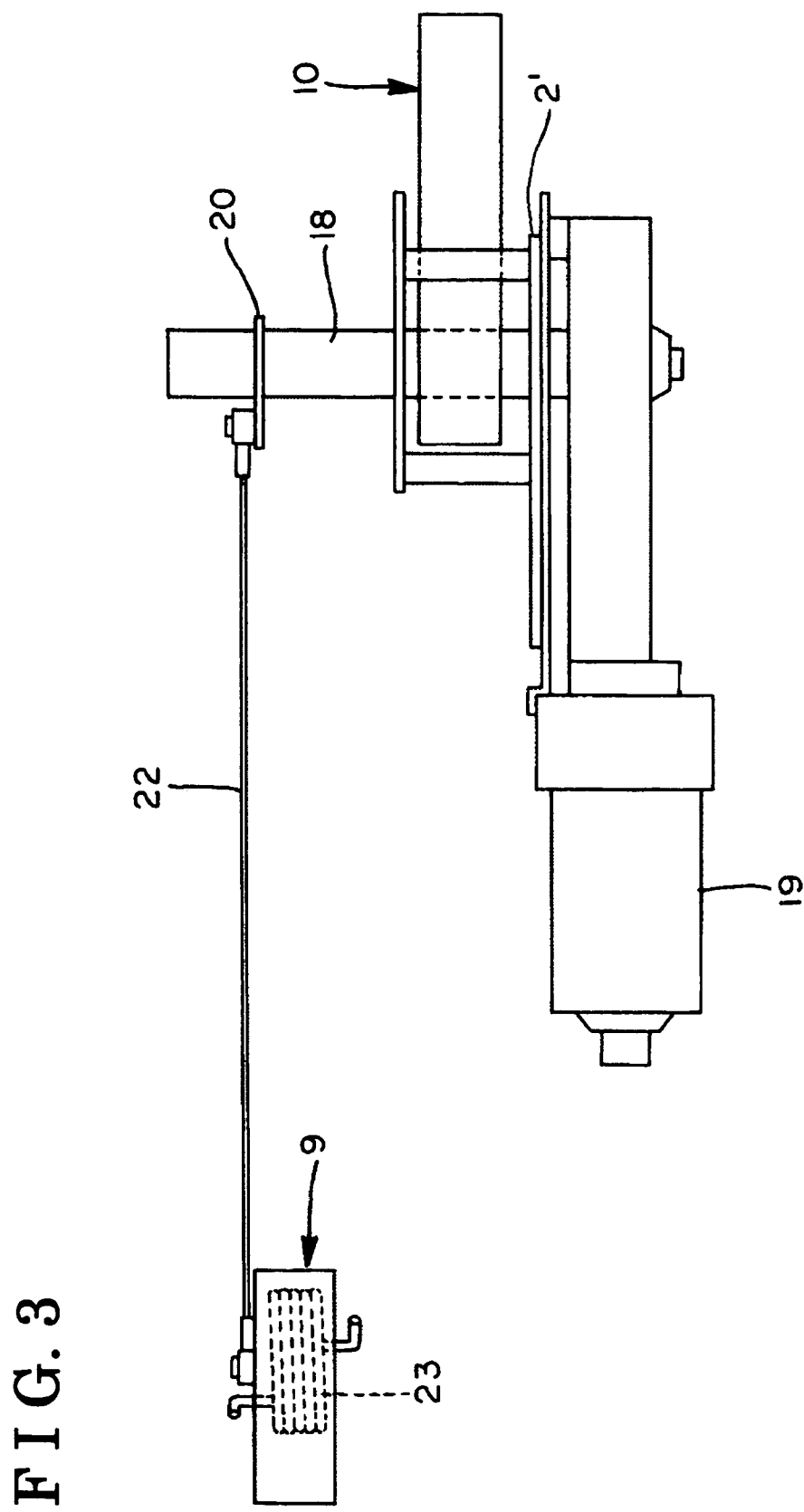
FIG. 3 is a plane view showing a front leg, a rear leg and the stranded cable.

A shaft 18 for rotatably supporting the rear leg 10 relative to the seat cushion frame 2' is rotated by an electric motor 19 that is retained by the seat cushion frame 2' as shown in FIG. 3. The operation of the electric motor 19 causes the shaft 18 to rotate, which leads to rotation of the rear leg 10 secured to the shaft 18 and the second link 13 secured to the rear leg 10 relative to the seat cushion 2.

As shown in FIG. 3, a bracket 20 is secured to an end portion of the shaft 18. A portion provided on a lower side of a pivot axis 21 (see FIG. 2) for supporting the front leg 9 relative to the seat cushion frame 2', and the bracket 20 are connected to each other by means of a stranded cable 22. The front leg 9 is biased in a clockwise direction in FIG. 2 by a spring 23, however, movement of the front leg 9 is restricted by a stopper 24.

Figure 2:
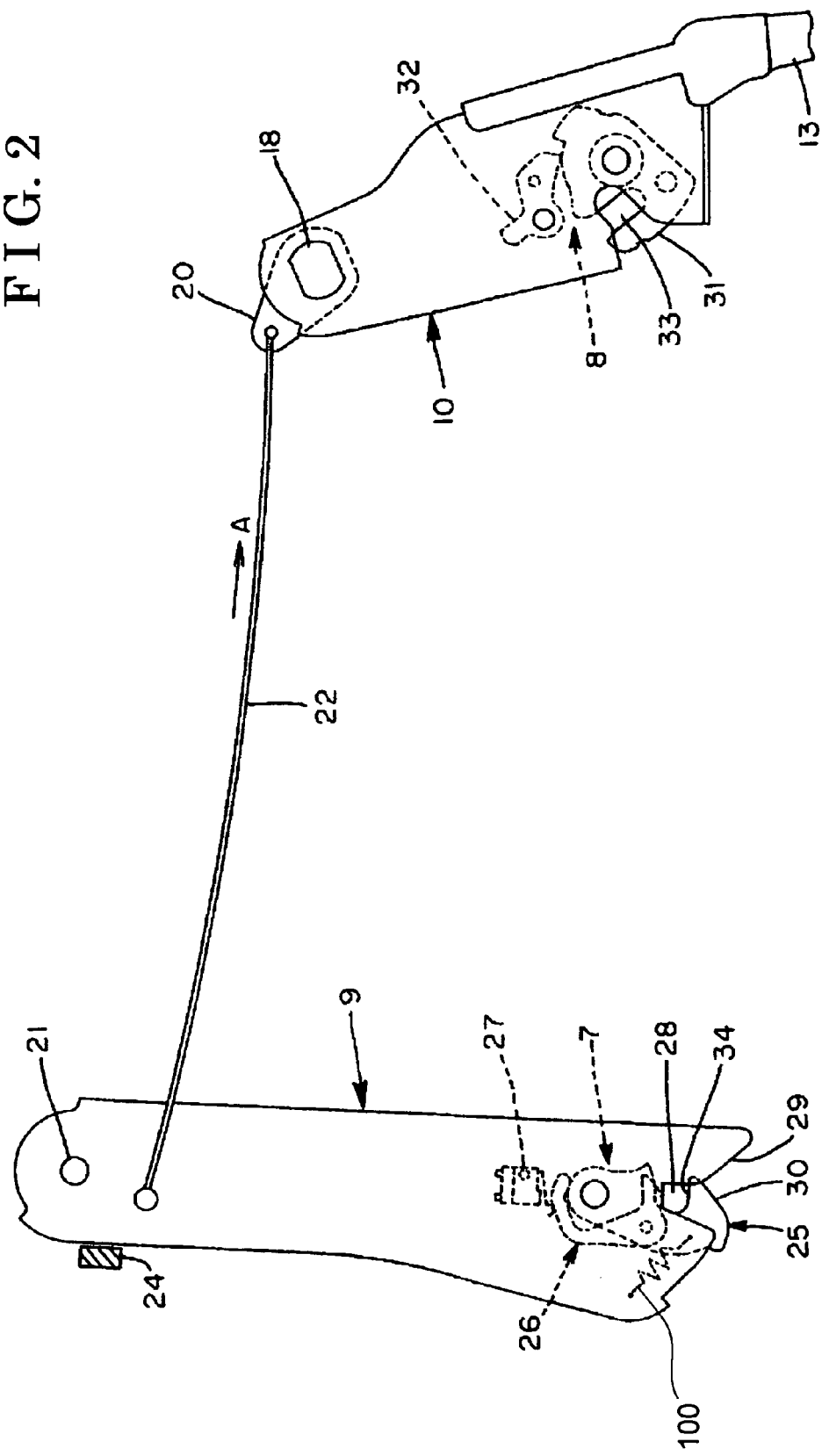
FIG. 2 is a front view showing a usage example of a stranded cable.
Figure 4:
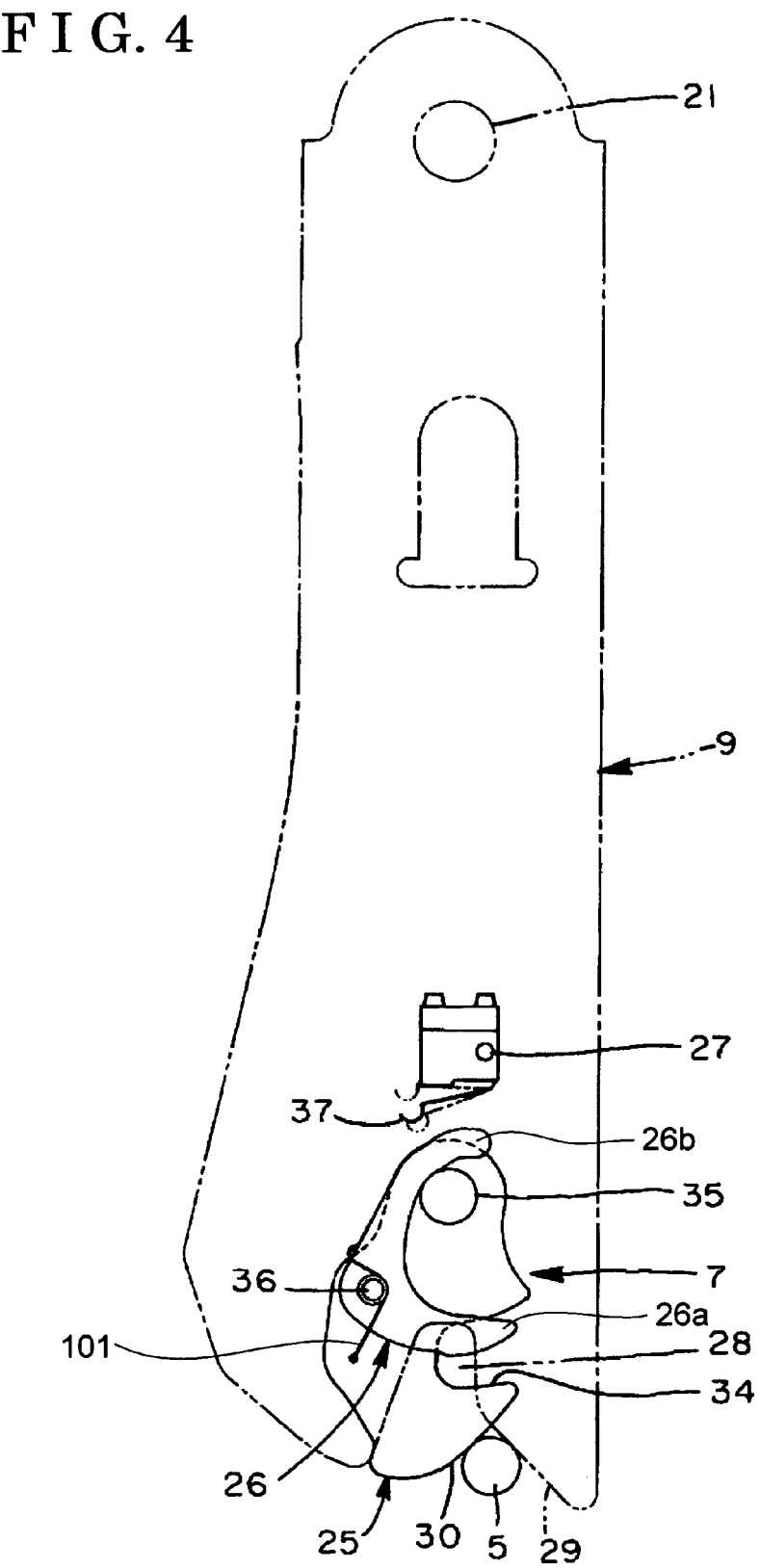
FIG. 4 is a plane view showing a state immediately before a striker enters into a groove of the front leg or a base member.

As shown in FIGS. 2 and 3, the lock device 7 provided at the front leg 9 (base member) includes a hook member 25 rotatably connected to the front leg 9, a lever 26 rotatably connected to the hook member 25, and a detection switch 27 (detecting unit) having a contact point that faces a free end portion 26b (second engaging portion) (see FIG. 4) of the lever 26. The hook member 25 and the lever 26 are biased by a first spring 100 and a second spring 101 (see FIG. 4) respectively such that the hook member 25 and the lever 26 are specified in a locked position as shown in FIG. 2. The first spring 100 biases the hook member 25 in a counterclockwise direction while the second spring 101 biases the lever 26 in a clockwise direction. A pivot axis 35 (rotation center) of the hook member 25 and a pivot axis 36 (rotation center) of the lever 26 are positioned in an offset manner as shown in FIG. 4. The striker 5 formed on the floor 4 of the vehicle enters along with a tapered face 29 into a groove 28 formed on a free end of the front leg 9. Precisely, the striker 5 makes contact with a tapered face 30 of the hook member 25 and then causes the hook member 25 to rotate in a clockwise direction against a biasing force of the first spring 100 so that the striker 5 enters into the groove 28. Next, the striker 5 rotates the lever 26 in a counterclockwise direction, which causes the free end portion 26b of the lever 26 to activate the detection switch 27. The detection switch 27 outputs a signal indicating that a locked state shown in FIG. 1 is obtained.

The lock device 8 provided at the rear leg 10 includes a latch 31 and a pawl 32, which are biased in one direction by a spring (not shown) when the pawl 32 and the latch 31 disengage from each other. The pawl 32 engages with the latch 31 by receiving a biasing force of the spring in case of a locked state shown in FIG. 2. A groove 33 is formed on the latch 31.

Next, a storage operation of the vehicle seat 1 is explained below. When an operation switch for stowing the seat 1 is turned to the ON position, the seat back 3 is folded forward. While the seat back 3 is folded forward, an actuator (not shown) is turned to the ON position so that the pawl 32 and the latch 31 of the lock device 8 are both rotated in the counterclockwise direction. The engagement between the striker 6 and the latch 31 are released accordingly. In addition, the electric motor 19 is driven so as to operate the shaft 18. Then, the rear leg 10 is rotated in the clockwise direction relative to the shaft 18, and the bracket 20 is also rotated in the clockwise direction. The rotation of the bracket 20 in the clockwise direction causes the stranded cable 22 to be pulled in an arrow A direction in FIG. 2 so that the front leg 9 is rotated in the counterclockwise direction relative to the pivot axis 21 of the front leg 9. The movement of the front leg 9 causes the striker 5 to push a tapered face 34 of the hook member 25 so as to rotate the hook member 25 in the clockwise direction. Then, the striker 5 is extracted from the groove 28, which leads to an unlocked state of the front leg 9. In this case, an actuator can be used for forcedly moving the hook member 25 in an unlocked position.

With the operation of the electric motor 19, the free ends of the respective legs 9 and 10 move in a direction so as to approach each other, and at the same time the rear leg 10 and the second link 13 connected as a unit thereto are rotated in the clockwise direction relative to the pivot axis 17. The vehicle seat 1 is stowed in the storage space 15 as shown by an imaginary line in FIG. 1 by the supporter having the four-link mechanism.

An example of the lock device 7 used in the front leg 9 of the foldable seat has been explained above with reference to FIGS. 1 to 3. However, the lock device 7 is applicable to not only the front leg 9 for the seat but also to a sliding door and the like. Accordingly, explanation for the case where the lock device 7 is used in a base member 9 is shown below. As shown in FIG. 4, when the striker 5 enters into the groove 28 along with the tapered face 29 of the base member 9, the striker 5 makes contact with the tapered face 30 of the hook member 25. Then, the hook member 25 is rotated in the clockwise direction relative to the pivot axis 35 against a biasing force of the spring 100 (see FIG. 2). The striker 5 can further enter into the groove 28 accordingly.

Figure 5:
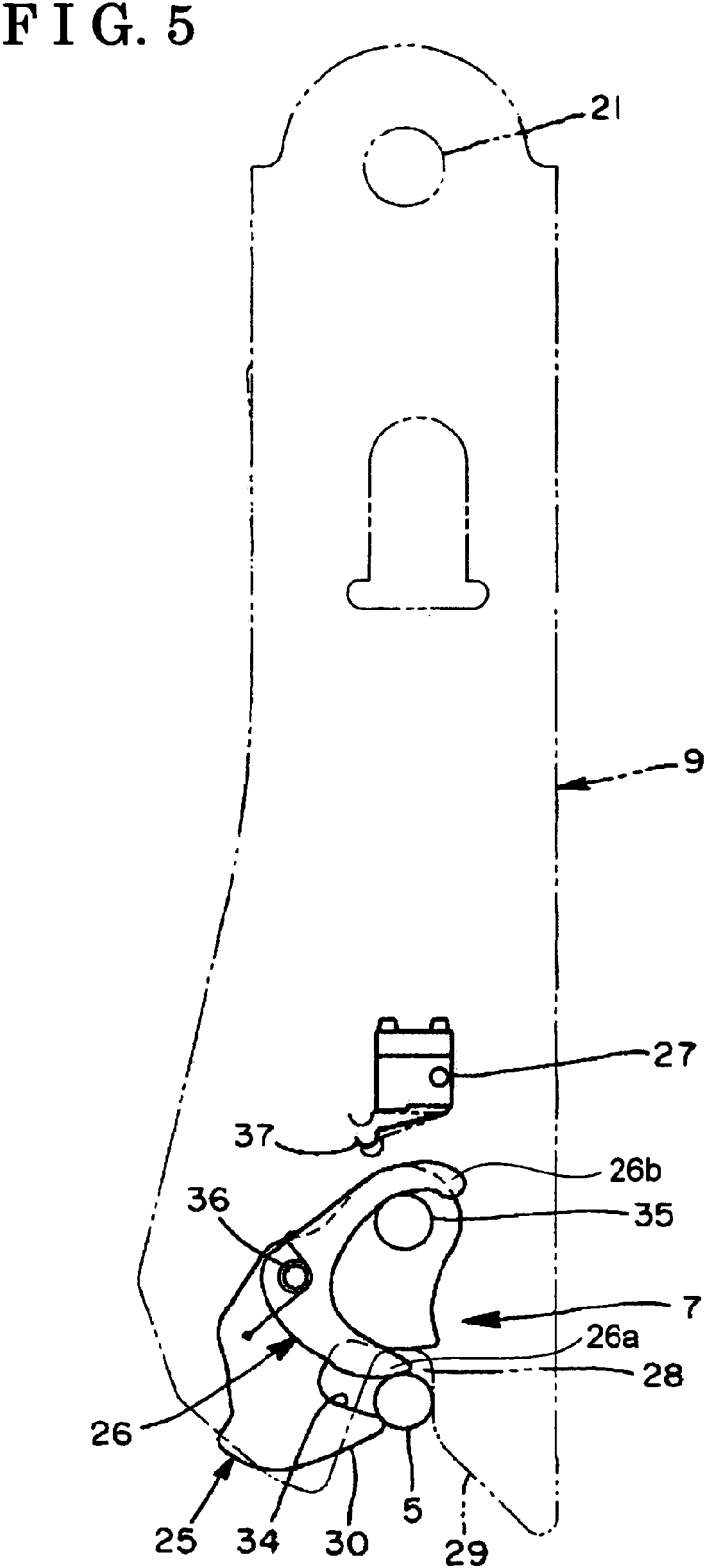
FIG. 5 is a plane view showing a state in which the striker enters into the groove of the base member or the front leg.
Figure 6:
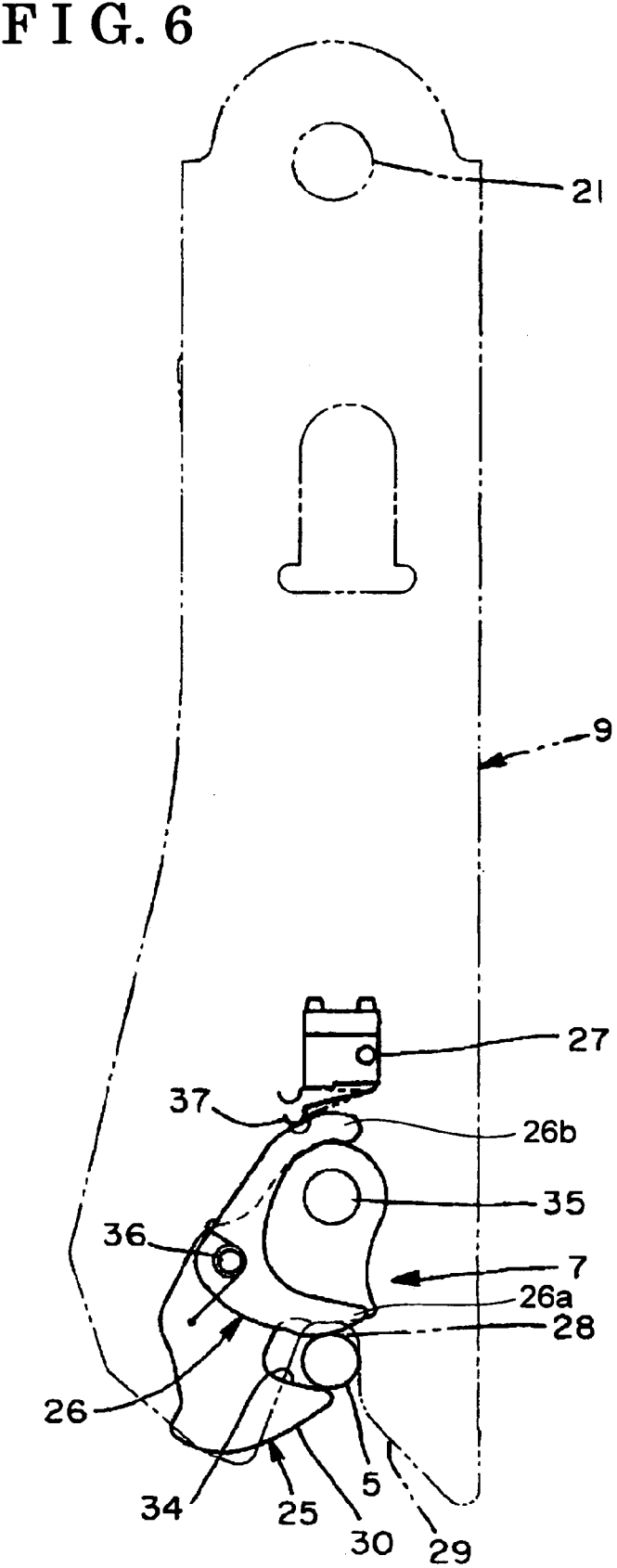
FIG. 6 is a plane view showing a state in which the striker pushes a lever.
Figure 7:
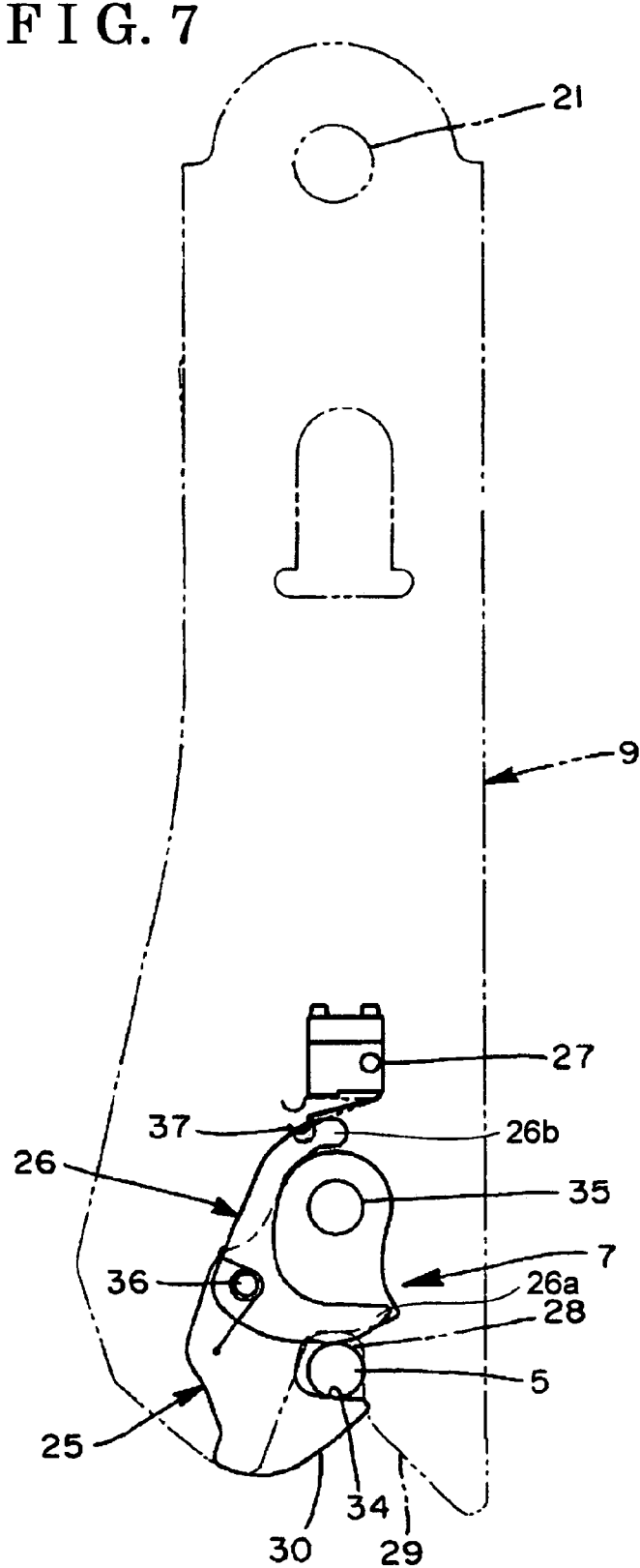
FIG. 7 is a plane view showing an engaging state between the hook member and the striker.
Figure 8:
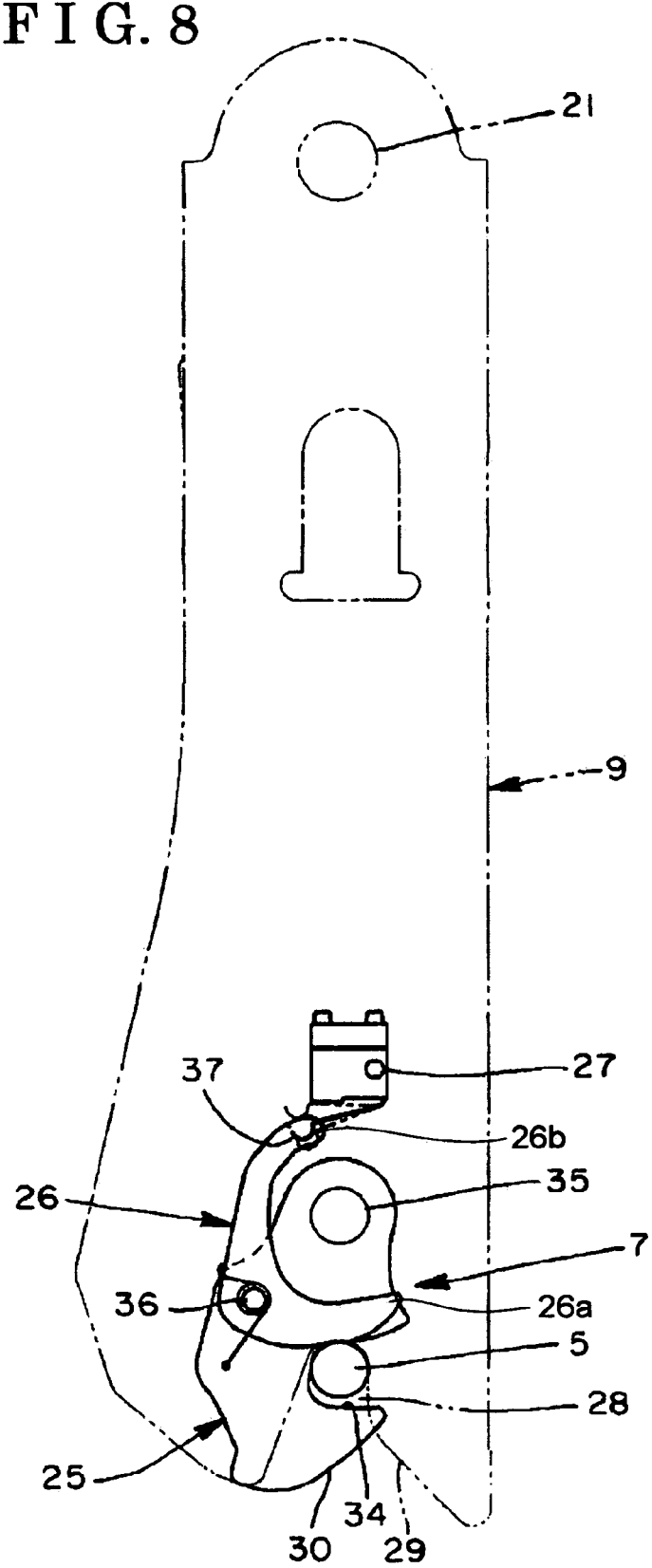
FIG. 8 is a plane view showing a state in which the striker pushes the lever to thereby activate a detection switch.

As shown in FIG. 5, the striker 5 that has entered into the groove 28 makes contact with a free end portion 26a (first engaging portion) on one end of the lever 26, thereby causing the lever 26 to rotate in the counterclockwise direction relative to the pivot axis 36. The lever 26 is rotatably supported on the hook member 25 by means of the pivot axis 36. When the striker 5 further enters into the groove 28, the striker 5 causes the lever 26 to further rotate in the counterclockwise direction as shown in FIG. 6. The free end portion 26b on the other end of the lever 26 makes contact with the contact point of the detection switch 27, i.e. an arm 37, which leads to the ON state of the detection switch 27 and the locked state in which the hook member 25 closes an opening portion of the groove 28 of the base member 9. FIGS. 7 and 8 show the locked state. An elastic silencer is provided within the groove 28 for the purposes of preventing occurrence of sound caused by contact between the striker 5 and the hook member 25 or the lever 26.

Figure 9:
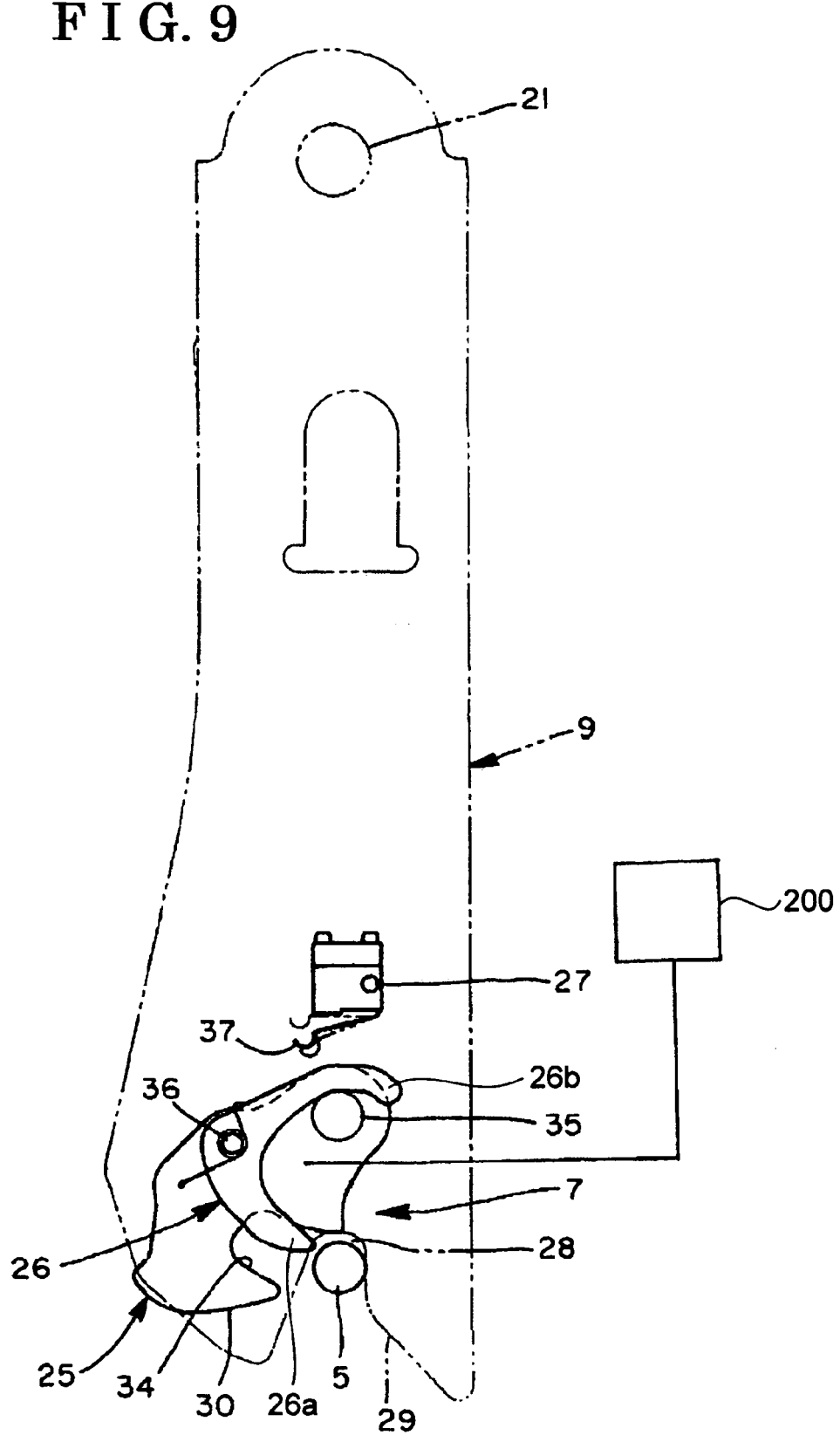
FIG. 9 is a plane view showing a state in which the hook member is moved to an unlocked position by means of an actuator.

When the detection switch 27 verifies that the striker 5 and the hook member 25 are brought in the locked state as shown in FIG. 8, the detection switch 27 outputs a signal indicating that the locked state is obtained. FIG. 9 is a view showing that the hook member 25 is rotated by an operation of an actuator 200 (i.e. the actuator 200 is turned to the ON position) in the clockwise direction to the unlocked position relative to the pivot axis 35. In the unlocked state, the hook member 25 can be separated from the striker 5 by the movement of the base member 9 in an upward direction in FIG. 9 or by the movement of the striker 5 in a downward direction in FIG. 9. With the actuator 200 turned to OFF position, the hook member 25 and the lever 26 rotatably supported on the hook member 25 can return to a state shown in FIG. 4 by means of the spring 100.

According to the aforementioned embodiment, the lock device 7 basically includes the single detection switch 27, the hook member 25, and the lever 26 rotatably connected to the hook member 25. Since the lever 26 is roratably connected to the hook member 25 and the lever 26 is operated with the detection switch 27, an angle of the hook member 25 and a presence of the striker 5 can be detected by the single detection switch 27 through the lever 26. A reduced cost of the device may be achieved accordingly.

Further, according to the aforementioned embodiment, the lever 26 is rotatably connected to the hook member 25 and the hook member 25 is rotatably attached to the base member 9 or the front leg 9 of the seat 1. Thus, a small installation space can be obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat for a vehicle comprising:
   a base member provided on the seat and including a groove in which a striker is received and from which the striker is extracted;
   a hook member rotatably connected to the base member;
   a lever rotatably connected to the hook member;
   a first spring for biasing the hook member in one direction;
   a second spring for biasing the lever in the other direction, wherein the hook member is moved to an unlocked position thereof by means of an actuator; and
   a switch that can be in contact with the lever; whereby the lever activates the switch when the striker is received in the groove and whose movement is prohibited by the hook member.

2. A seat for a vehicle according to claim 1, wherein the switch detects a locked state of the base member.

3. A seat for a vehicle in which a seat cushion and a seat back folded down onto the seat cushion are stowed into a storage space formed on a floor of the vehicle, comprising:
   a front leg for supporting a front portion of the seat cushion;
   a rear leg provided on a rear portion of the seat cushion and including a lock member engaging with an engaging member provided on the floor of the vehicle;
   a groove formed on the front leg for receiving a striker;
   a hook member rotatably connected to the front leg and for opening or closing an opening portion of the groove;
   a lever rotatably connected to the hook member; and
   a switch supported on the front leg and activated by the lever.

4. A seat for a vehicle according to claim 3, wherein the switch detects a locked state of the front leg.

5. A seat for a vehicle according to claim 3, wherein the hook member is moved to an unlocked position thereof by an actuator.

6. A seat for a vehicle comprising:
   a leg for supporting the seat and including a groove for receiving a striker;
   a hook member rotatably connected to the leg and for opening or closing an opening portion of the groove;
   a lever rotatably connected to the hook member; and
   a detecting unit activated by the lever;
   wherein the striker is received in the groove by engaging with the hook member so as to rotate the hook member in one direction, and by engaging with the lever so as to rotate the lever from the one direction to another direction.

7. A seat for a vehicle according to claim 6, wherein the detecting unit is a switch, the lever includes a first engaging portion engaging with the striker and a second engaging portion engaging with the switch, and the lever is rotated by an engagement between the striker and the first engaging portion so that the second engaging portion is made to contact with the switch.

8. A seat for a vehicle according to claim 6, wherein a pivot axis of the hook member and a pivot axis of the lever are positioned in an offset manner.

9. A seat for a vehicle according to claim 6, wherein the detecting unit detects a locked state of the leg.

* * * * *